(12) United States Patent
Yonezu et al.

(10) Patent No.: US 6,915,104 B2
(45) Date of Patent: Jul. 5, 2005

(54) EDUCATION SYSTEM SUITABLE FOR GROUP LEARNING

(75) Inventors: Yasufumi Yonezu, Tokyo (JP); Masanobu Osaki, Tokyo (JP); Shuichi Ito, Tokyo (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 111 days.

(21) Appl. No.: 10/096,857

(22) Filed: Mar. 14, 2002

(65) Prior Publication Data

US 2002/0132217 A1 Sep. 19, 2002

(30) Foreign Application Priority Data

Mar. 19, 2001 (JP) ........................................ 2001-078136

(51) Int. Cl.[7] ................................................ G09B 9/00
(52) U.S. Cl. ...................................... 434/350; 434/322
(58) Field of Search ................................ 434/322, 323, 434/350, 365, 307 R, 362; 705/14

(56) References Cited

U.S. PATENT DOCUMENTS

| | | | | |
|---|---|---|---|---|
| 5,263,869 A | * | 11/1993 | Ziv-El | ........................ 709/204 |
| 6,029,043 A | * | 2/2000 | Ho et al. | ..................... 434/350 |
| 6,148,174 A | * | 11/2000 | Remschel | ................... 434/350 |
| 6,160,987 A | * | 12/2000 | Ho et al. | ..................... 434/350 |
| 6,302,698 B1 | * | 10/2001 | Ziv-El | ........................ 434/323 |
| 6,471,521 B1 | * | 10/2002 | Dornbush et al. | .......... 434/322 |

FOREIGN PATENT DOCUMENTS

| | | |
|---|---|---|
| JP | 5-216389 | 8/1993 |
| JP | 9-222845 | 8/1997 |
| JP | 11-65411 | 3/1999 |
| JP | 2000-98865 | 4/2000 |

OTHER PUBLICATIONS

Japanese Office Action dated Jan. 13, 2005 and English Translation.

H. Cho, et al., Development of Collaborative..., 1997, pp. 1982–1993 vol. J80–D–11 No. 7.

* cited by examiner

Primary Examiner—Xuan M. Thai
Assistant Examiner—Kathleen M. Christman
(74) Attorney, Agent, or Firm—Westerman Hattori Daniels & Adrian, LLP

(57) ABSTRACT

An education system includes a network, individual learning terminals, a group learning terminal and a learning management server. The individual learning terminals are connected with the network and are provided for individual learning of students. The group learning terminal is connected with the network and provided for group learning of a group of the students. The learning management server is connected with the network to provide first education modules for the individual learning to the individual learning terminals and second education modules for the group learning to the group learning terminal.

16 Claims, 7 Drawing Sheets

Fig. 5

| GROUP | NAME | TEST RESULT | CHARACTER ESTIMATION | REASONS OF GROUPING |
|---|---|---|---|---|
| 1ST GROUP | A | 5 | LOW ERROR RATE (5), TEACHING ABILITY (5) | A TEACHES C AND B TEACHES C SCHEME OF KEEPING CONCENTRATION |
| | B | 4 | HIGH EXERCISE LEVEL (5), MANY QUESTIONS (5) | |
| | C | 3 | LOW ERROR RATE (2), KEEPING CONCENTRATION (2) | |
| 2ND GROUP | D | 4 | MANY QUESTIONS (5) | F IS INFLUENCED BY D AND E TO START TO TALK |
| | E | 4 | MANY QUESTIONS (5) | |
| | F | 2 | COMMUNICATION ABILITY (2) | |
| 3RD GROUP | G | 5 | LOW ERROR RATE (5), TEACHING ABILITY (5) | I AND J LEARN HOW TO DO BY G AND H AND MAKE PROGRESS |
| | H | 5 | LOW ERROR RATE (5), MANY QUESTIONS (5) | |
| | I | 3 | LOW ERROR RATE (2), HIGH EXERCISE LEVEL (2) | |
| | J | 3 | LOW ERROR RATE (2), KEEPING CONCENTRATION (2) | |

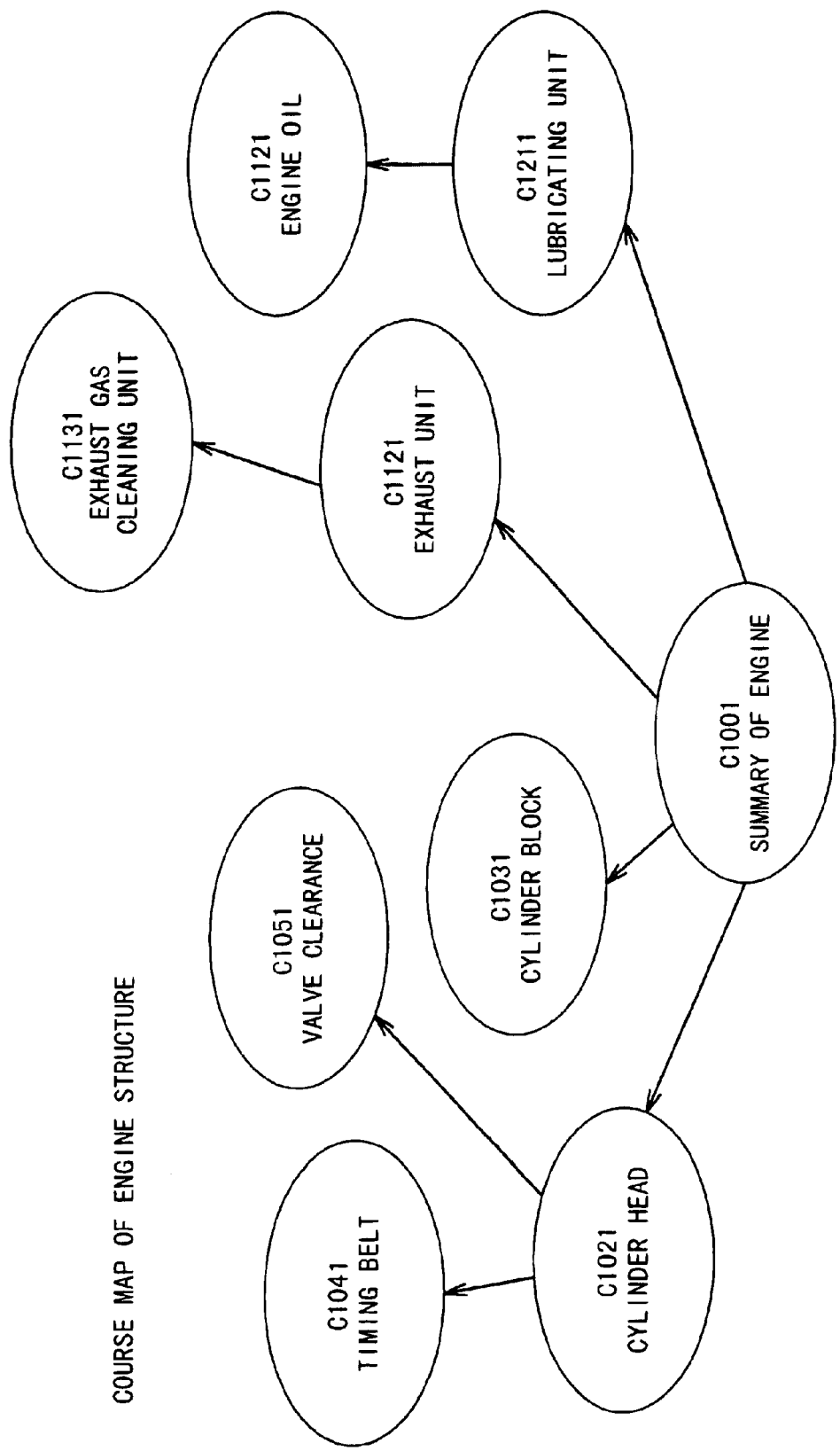

Fig. 8

| GROUP | NAME | TEST RESULT | ANALYSIS OF TEST RESULT |
|---|---|---|---|
| 1ST GROUP | A | 5 | C MAKES PROGRESS AND A AND B MAKE FURTHER PROGRESS |
| | B | 4 | |
| | C | 4 | LOW ERROR RATE (3), KEEPING CONCENTRATION (3) |
| 2ND GROUP | D | 4 | D, E AND F BECOME FRIENDLY AND F BECOMES CHEERFUL |
| | E | 4 | |
| | F | 3 | F CAN COMMUNICATE WITH OTHERS (3) |
| 3RD GROUP | G | 5 | I AND J MAKE PROGRESS AND LEADERSHIP OF H INCREASES |
| | H | 5 | LOW ERROR RATE (5), TEACHING ABILITY (5) |
| | I | 4 | LOW ERROR RATE (3), HIGH EXERCISE LEVEL (3) |
| | J | 4 | LOW ERROR RATE (3), KEEPING CONCENTRATION (3) |

EDUCATION SYSTEM SUITABLE FOR GROUP LEARNING

BACKGROUND OF THE INVENTION

1. Field of the Invention

The present invention relates to an education system, and more particularly, to an education system by which the ability of a student can be improved through group learning and self-learning.

2. Description of the Related Art

In a conventional school, class organization is carried out in accordance with rules determined by the side of the school. One teacher is in charge of the organized class. In an elementary school, the teacher in charge teaches most of subjects. In a junior high school, a teacher teaches each of subjects. In such a conventional schooling, how to handle the personality of each of students of a class and the personality of the class depends on the personal determination of the teacher.

Recently, education systems using computers such as CBT (Computer Based Training) and WBT (Web Based Training) are being introduced. Such an education system is disclosed in Japanese Laid Open Patent Application (JP-A-Heisei 5-216389) entitled "learning apparatus". This learning apparatus acquires a final learning goal and a present comprehension degree of a student, selects items to be learned by the student and a comprehension target based on the acquired learning goal and comprehension degree, and reads out teaching materials based on the selected items and the comprehension target to provide for the learning of the student.

Also, "teaching material management by computer and learning support method" is disclosed in Japanese Laid Open Patent Application (JP-A-Heisei 9-222845). In this reference, data are collected from existing materials relating to a specific subject and classified based on related element terms, to form material blocks. The material blocks are linked perpendicularly to form a tree structure. Also, separately from the tree structure of the material blocks, the material blocks are selected in accordance with the theme and purpose of the learning, and the selected material blocks are combined to form a subject block and a lecture block as an upper rank of a group of the subject blocks. Thus, standardized education becomes possible.

Also, an "individual test problem automatic creating apparatus for system learning" is disclosed in Japanese Laid Open Patent Application (JP-A-Heisei 11-65411). In this reference, a teacher or student determines a chapter or unit necessary to learn at present in accordance with a learning result list displayed by a list display section. In the learning result list, learning ended items and learning un-ended items on a system of learning items are displayed with different colors. The determined chapter or unit is specified by a specifying unit. In response to the specification, a progress management section operates a creating section in relation to a learning result administration section to extract registration values for the optimal problem items. A problem synthesizing section reads out problem data from a teaching material data memory section based on the registration values, and a test problem presentation section presents problems corresponding to the problem data to the student or teacher. The test results of the presented problems are inputted to a result input section, and a student personal data memory section, the progress management section and the learning result administration section are updated based on the test result.

Moreover, a "learning support system" is disclosed in Japanese Laid Open Patent Application (JP-P2000-98865A). In the learning support system, a plurality of teaching materials stored in a WWW server on a teaching material server are provided to a student through a client apparatus. At this time, guidance is produced by a learning guidance functional section of a learning program in the client apparatus based on one or more link data for a predetermined relation between the teaching materials, learning history data about each of the teaching materials by every student, and evaluation data to each teaching material by the student. The learning teaching materials are classified in a tree structure of a plurality of hierarchical layers, and the link data is set for every hierarchical layer. The student can carry forward the learning while tracing systematically related teaching materials, with the consideration of the guidance.

By the way, in the present schooling, it is a purpose to improve the level of the whole of students, and the improvement of the level of each student is neglected. On the other hand, each of the above-mentioned conventional examples has a purpose of the individual level improvement by educating each of the students. However, the conventional examples are not suitable for group learning.

SUMMARY OF THE INVENTION

Therefore, an object of the present invention is to provide an education system, in which the whole groups of students can be improved in a skill level.

Another object of the present invention is to provide an education system, in which education can be made suitable for the individual ability of each of students.

Still another object of the present invention is to provide an education system, in which the skill level of each student can be improved.

In an aspect of the present invention, an education system includes a network, individual learning terminals, a group learning terminal and a learning management server. The individual learning terminals are connected with the network and are provided for individual learning of students. The group learning terminal is connected with the network and provided for group learning of a group of the students. The learning management server is connected with the network to provide first education modules for the individual learning to the individual learning terminals and second education modules for the group learning to the group learning terminal.

Here, the education system may further include a database apparatus which stores a student database which has personal data of the students, and a group database which has a group organization list including education items corresponding to education purposes. The learning management server automatically organizes the group based on the personal data of the students and selected ones of the education items.

In this case, it is desirable that the personal data includes ability data and character data of each of the students. Also, the learning management server may represent the education items of the group organization list to a teacher to allow the teacher to select one of the education items based on education policies.

Also, the database apparatus may further store a teaching materials database which has education modules including the first and second education modules. The learning management server supplies the first and second education modules to the individual and group learning terminals, respectively.

In this case, the teaching materials database may further have an education module management file which indicates link relations of the education modules, and each of the link relations is determined based on one kind of the group. The learning management server refers to the education module management file based on the kind of the group to supply the first and second education modules to the individual and group learning terminals, respectively.

Also, each of the education modules may have sub-modules in a hierarchy, and the individual learning and the group learning may be carried out based on the sub-modules in the hierarchy.

Also, the database apparatus may further store an evaluation database which has evaluation materials. Each of the first and second education modules has a learning time limit. In this case, the learning management server refers to the evaluation database to retrieve one of the evaluation materials corresponding to the group when the individual learning or group learning is ended within the learning time limit, and supplies a test to the individual learning terminal for each of the students or the group learning terminals for the group based on the retrieved evaluation material.

Also, the learning management server may evaluate the students of the group or the group based on a result of the test, and stores the test result in the student database.

Also, the learning management server may determine whether the group should be reorganized, based on the test result when the individual learning of a set of the first education modules is ended or the group learning of a set of the second education modules is ended.

In another aspect of the present invention, an education method is achieved by (a) automatically organizing a group of students for a selected education course; by (b) supplying first education modules to an individual learning terminal via a network for individual learning of each student of the group; by (c) supplying second education modules to a group learning terminal via the network for group learning of the group; by (d) carrying out a test to evaluate the students and the group; and by (e) selectively reorganizing the group based on the evaluation result.

The (a) automatically organizing step may be achieved by (f) retrieving personal data of the students from a student database; by (g) retrieving a group organization list from a group database, the group organization list including education items, one of which corresponds to the selected education course; and by (h) automatically organizing the group based on the personal data and one of the education items corresponding to the selected education course. In this case, it is desirable that the personal data includes ability data and character data of each of the students.

Also, the (g) retrieving step may be achieved by representing the education items of the group organization list to allow a teacher to select one of the education items based on education policies.

Also, the (b) supplying step may be achieved by retrieving the first education modules from a teaching materials database based on the education course to supply the first education modules. Also, the (c) supplying step may be achieved by retrieving the second education modules from the teaching materials database based on the education course to supply the education modules.

Also, each of the (b) and (c) supplying steps may be achieved by referring to an education module management file of the teaching materials database based on the education course to determines the first or second education modules, wherein the education module management file indicates link relations of education modules, and each of the link relations is determined based on the education course.

In this case, each of the education modules may have sub-modules in a hierarchy, and the individual learning and the group learning may be carried out based on the sub-modules in the hierarchy.

Also, each of the first and second education modules has a learning time limit. In this case, the (d) carrying out step may be achieved by referring to an evaluation database to retrieve one of evaluation materials corresponding to the education course when the individual learning or group learning is ended within the learning time limit; and by carrying the test which is produced from the retrieved evaluation material.

Also, the (d) carrying out step may include the step of: storing the test result in a student database.

BRIEF DESCRIPTION OF THE DRAWINGS

FIG. 5 is a diagram showing an example of the group organization in the education system according to the embodiment of the present invention;

FIG. 7 is a diagram showing an example of a course map used in the education system according to the embodiment of the present invention; and FIG. 8 is a diagram showing an example of education results in the education system according to the embodiment of the present invention.

DESCRIPTION OF THE PREFERRED EMBODIMENTS

Hereinafter, an education system of the present invention will be described in detail with reference to the attached drawings. In the following description, the education system will be described by taking education in an automobile service vocational college where servicemen of an automobile are trained, as an example. However, the present invention can be applied to the education in various types of school in addition to the automobile service vocational college.

Figure 1:
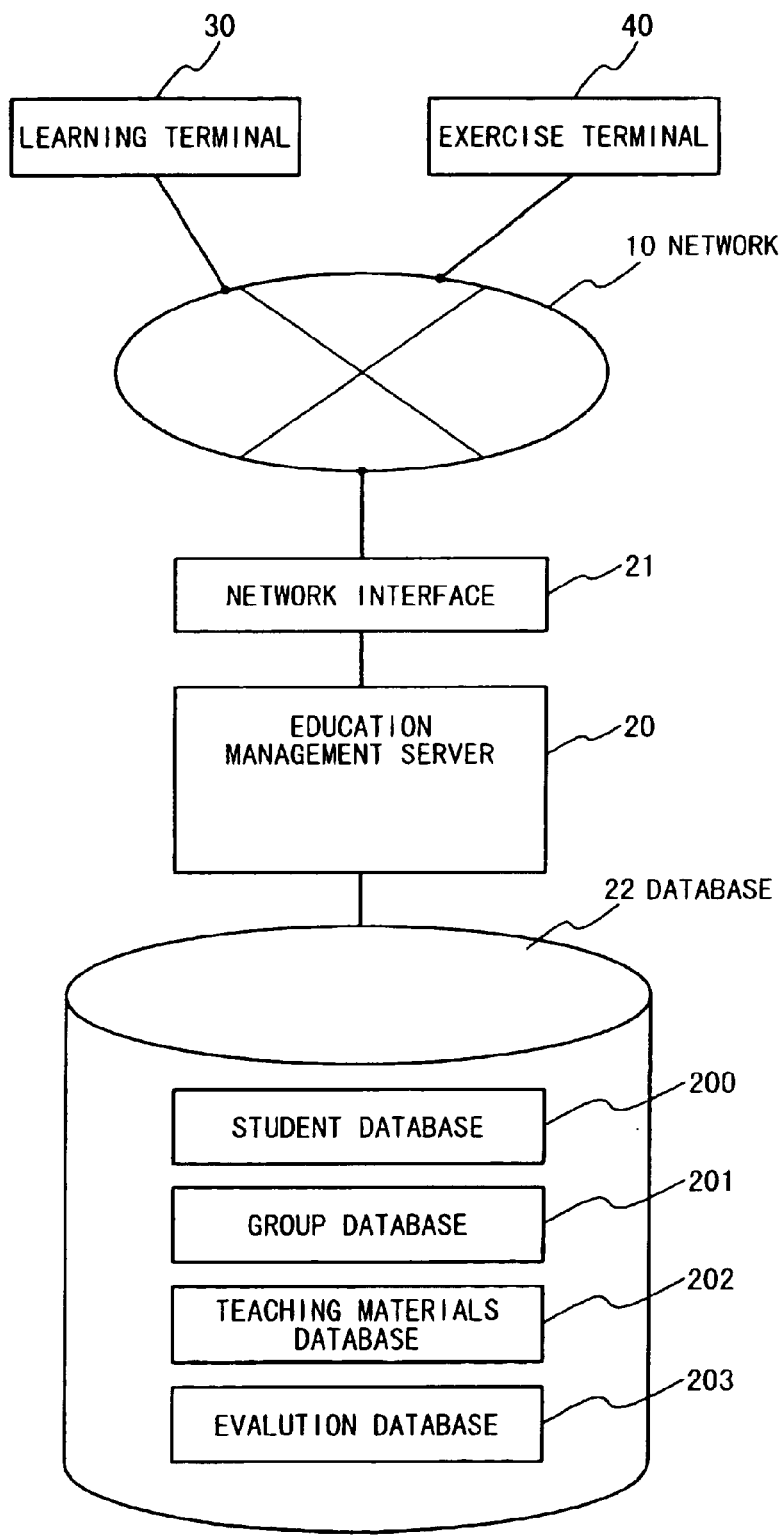
FIG. 1 is a block diagram showing the configuration of an education system according to an embodiment of the present invention.

FIG. 1 is a block diagram showing the configuration of the education system according to an embodiment of the present invention. The education system is comprised of a network 10, an education management server 20, a learning terminal 30 and an exercise terminal 40. The network 10 is comprised of the Internet, for example. It should be noted that the network 10 might be either one of various types of networks such as a local area network (LAN), and a private network in addition to the Internet.

Also, the education management server 20 is comprised of a data processor (not shown) such as a personal computer, a workstation, and a multi-purpose computer, and the data processor has an input section and a display section (both not shown). The education management server 20 is connected with the network 10 through a network interface 21. The education management server 20 supports the organization of groups, and accesses the database apparatus 22 to precede the education of the groups and students.

The database apparatus 22 is connected with the education management server 20. The database apparatus 22 is comprised of a disk unit. The database apparatus 22 contains a student database 200, a group database 201, a teaching materials database 202 and an evaluation database 203. The details of each of the databases will be described later.

The learning terminal 30 is comprised of a personal computer system. The learning terminal 30 is used for the student to access the education management server 20 through the network 10 for learning.

The exercise terminal 40 is comprised of a personal computer system. The exercise terminal 40 is used for the student to access the education management server 20 through the network 10 and to carry out practical exercise training.

Next, the databases formed in the database apparatus 22 will be described.

Figure 2:
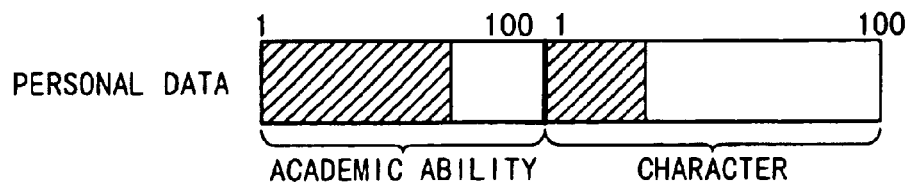
FIG. 2 is a diagram to show personal data used in the education system according to the embodiment of the present invention.

The student database 200 stores the personal data of each of students. The personal data is comprised of individual data, academic ability data and character data shown in FIG. 2. The individual data is comprised of an address, name, age, a phone number, a protector and so on. The academic ability data shows academic ability of the student. The character data shows the character of the student. The individual data is used to specify the student. The academic ability data and the character data of the student at the present time are expressed in 100 steps. The academic ability data and the character data in 100 steps are converted into 5 steps through the following evaluation. In this case, "90 to 100" is converted into "5", "75 to 89" is converted into "4", "60 to 74" is converted into "3", "40 to 59" is converted into "2", and "equal to or less than 39" is converted into "1".

The academic ability data is obtained based on a test carried out in each step of the education. However, the initial value of the academic ability data is determined in an admission test. Specifically, the automobile service vocational college recruits applicants, and implements the admission test to the applicants to select the students. The admission test is carried out in the form of a paper test. The test results are registered on the student database 200 of the database apparatus 22 as the academic ability data for every student. It should be noted that the admission test might be carried out using systems such as CBT and WBT. In this case, there is an advantage that a marking process, an inputting process of a score, and a summing process can be quickly carried out.

Figure 3:
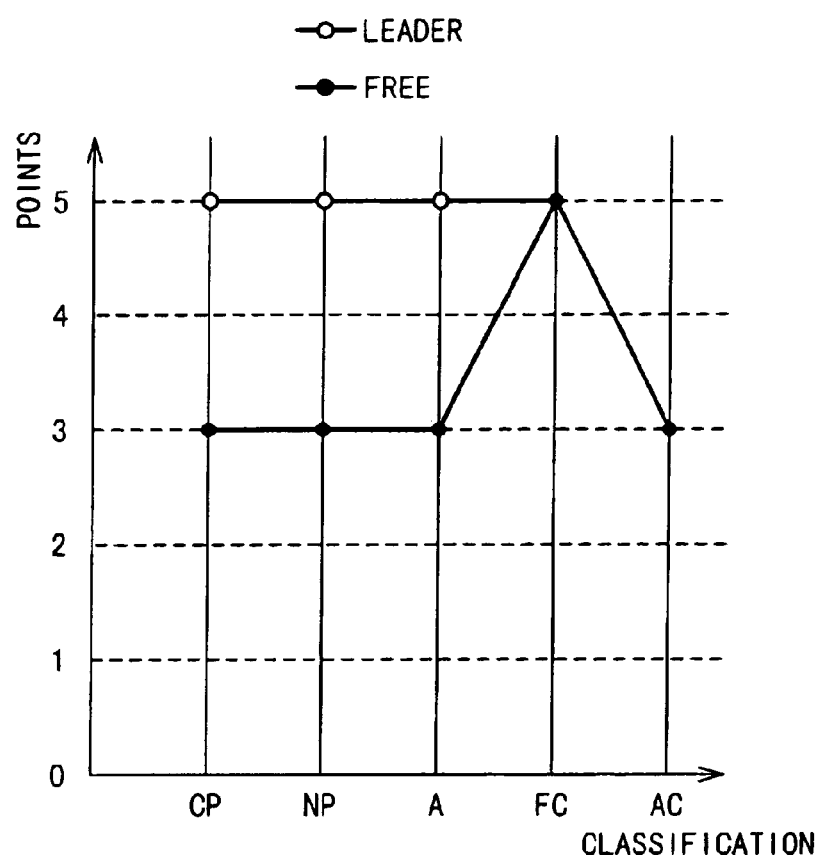
FIG. 3 is a diagram showing an example of character data used in the education system according to the embodiment of the present invention.

The character data shows the character of the student. The character data is acquired through a character diagnostic test. It should be noted that the interview result of the student with an interviewer might be used as the character data. The character diagnostic test may be carried out using an ego gram theory. In this theory, questions of about 20 to 50 are prepared and answerers to the questions are classified into five classes such as CP, NP, A, FC and AC. Each of the classes is further classified into five subclasses. Here, CP (Critical Parent) represents "the heart of the critical parents", NP (Nurturl Parent) represents "the heart of the nurturl parents", A (Adult) represents "the heart of the parents", FC (Free Child) represents "the heart of the free child", and AC (Adapted Child) represents "the heart of the adapted child". FIG. 3 shows an example of the character data. The student specified by black points has the character of a free heart. Also, the student specified by white points has the character for a leader. The character data can be quickly acquired because the time of the character diagnostic test is about 10 minutes.

As mentioned above, the personal data is used as history data. That is, the academic ability data and the character data are registered on the student database 200 with date and time data. Therefore, the personal data is updated in accordance with the education in each course to be described later.

The group database 201 stores group data and a group organization list. The group data is comprised of members (students) of each group. It should be noted that character or kind of each group is determined, considering education contents, the age of the student, the characters of the students, education policy, an education goal of the school (containing a teacher individual).

The group organization list in the embodiment is exemplified below.

(1-1) The organization to keep the group skill level at an average level or higher;
(1-2) The organization to draw up a high skill level of a student to a higher level and a low skill level of a student to a standard level;
(1-3) The organization to draw up a middle skill level of a student to a higher skill level;
(1-4) The organization to draw up a lower skill level of a student to a middle skill level;
(1-5) The organization to draw up a high skill level of a student to a higher level with respect to the character of autonomy;
(1-6) The organization to draw up a skill level of a student in leadership with respect to teaching ability to other persons;
(1-7) The organization to draw up the low or middle skill level of a student, considering the character such as cooperate-ability and communication ability of the student;
(1-8) The organization to draw up the skill level of the whole group, considering the autonomy of the student and the hope of the group;
(1-9) The organization to draw up the skill level of the whole group by drawing up the cooperate-ability and publicity of each student; and
(1-10) The organization to draw up a skill level in an optional combination of the above organizations (1-1) to (1-9).

The group organization can be changed in accordance with the education policies of the school or the education policy of the grade at any time.

The teaching materials database 202 stores teaching materials programs and an education module management file. The teaching materials are previously prepared, and the teaching material program is configured by reconfiguring the teaching materials in the form of module in accordance with the course of the education. The learning teaching materials program is called a learning module (also, called an "education module"). Each education module is contained in the teaching materials database 202, and is comprised of a module master file, a skill checking master file, a right answer master file, an approval test master file, a still image and video master file and so on. The module master file stores the data to explain the contents of the education module. The skill checking master file stores problems to check the skill of the student. The right answer master file stores the right answers of the problems. The approval test master file stores problems and right answers in the final test of the education module. The still image and video master file stores a video image and a still image used as the teaching materials.

In the education system according to the embodiment, one education module is used in each step of the education. It should be noted that the education modules are configured for the student to carry out individual learning in step-by-step manner from a basic learning step to an application learning step, because the modules have relation mutually. Especially, in the education to get a qualification for a serviceman, education contents are determined in detail. Also, the education modules are classified in detail to have a hierarchical structure. The education module management file stores link relations of the education modules for every education course. Also, each education module is related to a skill level and has relation data to the skill level. Therefore, the student can carry forward the learning along the learning course in order without being conscious. Also, when the student tries to learn a completely different subject, the necessary education module can be accurately known.

The evaluation database 203 stores the evaluation of each group and each student. The evaluation database 203 is comprised of an index file, an individual answer file, a groups answer file, an individual answer result file, a group answer result file, and a field file. It should be noted that the character of the student is evaluated using the following items:

(2-1) A low erroneous answer rate;
(2-2) high skill level in practice;
(2-3) no repetition of similar error;
(2-4) learning of more education modules;
(2-5) faster progress of the whole group;
(2-6) presentation of a research result and a practice result as a leader;
(2-7) accurate presentation of the learned education module;
(2-8) education to other persons;
(2-9) achievement of team work in the group
(2-10) many questions;
(2-11) keeping of rules;
(2-12) housekeeping;
(2-13) successful communication; and
(2-14) continuation of concentration.

Figure 4:
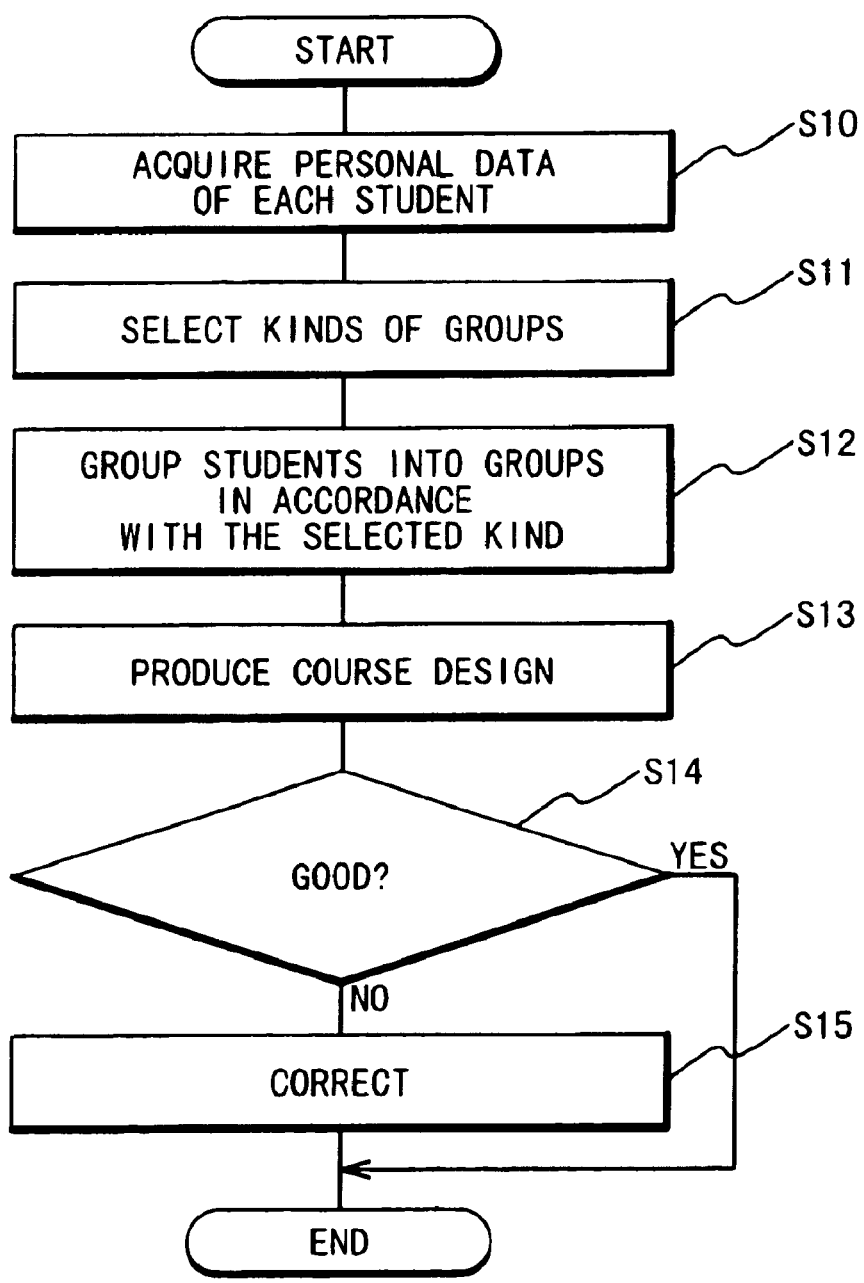
FIG. 4 is a flow chart showing an operation of group organization in the education system according to the embodiment of the present invention.
Figure 6:
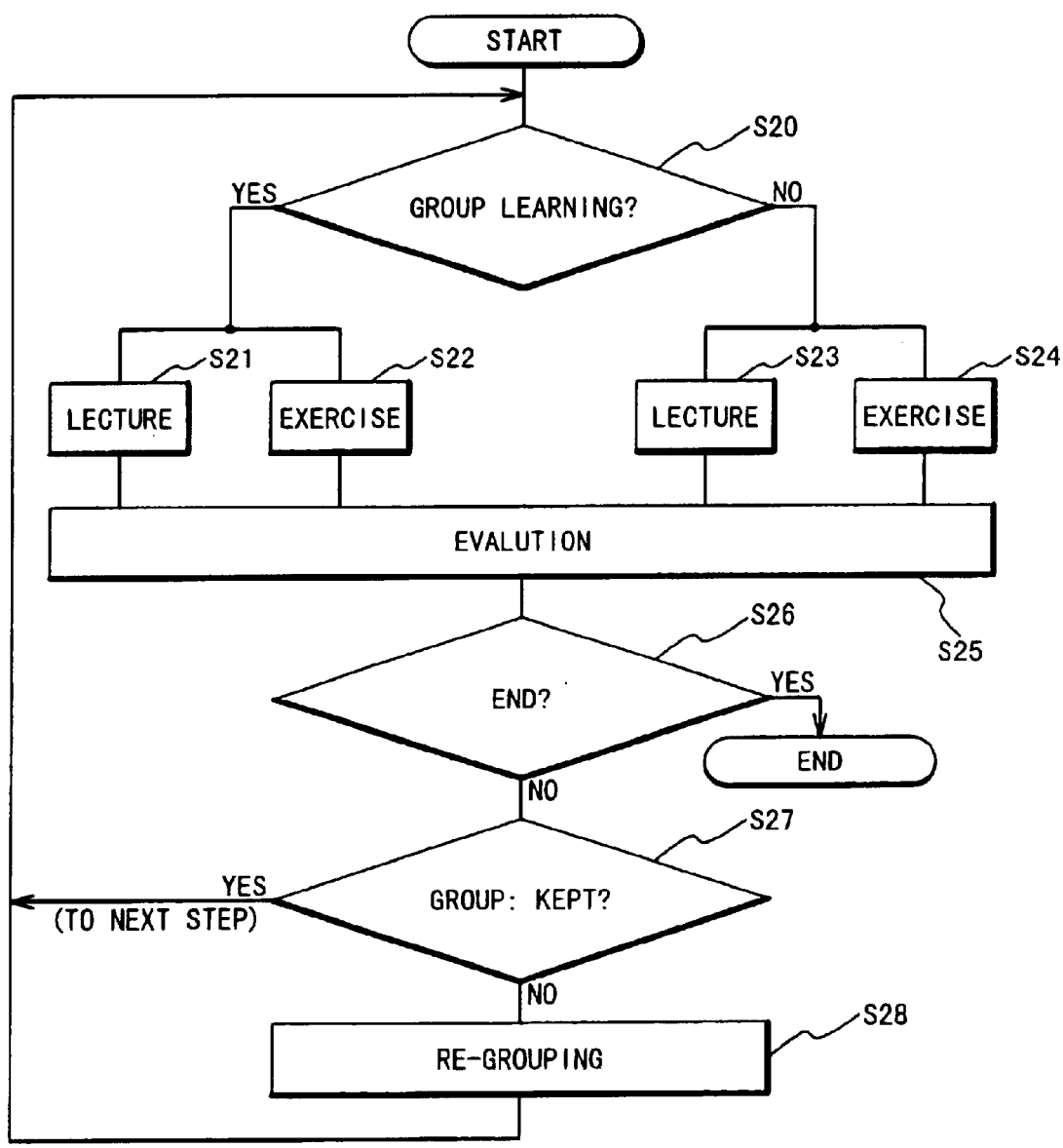
FIG. 6 is a flow chart showing an education process in the education system according to the embodiment of the present invention.

Next, the operation of the above-mentioned education system will be described with reference to flow charts of FIGS. 4 and 6.

In the education system, the organization of the groups is first carried out, and then the learning is carried out. As shown in the flow chart of FIG. 4, a teacher operates the education management server 20 to acquire the personal data of the students from the student database 200 and displays the personal data (Step S10). The teacher views the displayed personal data of the students and decides education policies. Then, the teacher operates the education management server 20 to acquire the group organization list from the group database 201, and displays the group organization list. The teacher views the displayed group organization list and selects the kinds of the groups to be organized based on the decided education policies (Step S11). That is, the groups are selected from among the above-mentioned (1-1) to (1-10) in the group organization list to meet the education policies of the automobile service vocational college.

The education management server 20 automatically groups the students based on the personal data of the students and the selected kinds of the groups (Step S12). Especially, the students are grouped based on both of the academic ability data and the character data of the personal data to meet the purpose of the kind of the group. In this case, what kind of the group should be organized by the students of what kinds of sets of the academic ability data and character data is previously set in the education management server 20 in accordance with the experience of teachers for every kind of group.

It should be noted that the personal data of the students in the early stages might not be enough to organize a group optimally. In such a case, the group is organized based on the test result data of the admission test and the character data of the personal data. A class is organized by gathering the organized groups appropriately.

Also, in the organization of the groups, the viewpoints of "a way that the students with various skill levels are averagely distributed in respective classes", "a way that the students are distributed for every skill level", and "a way that the students are distributed based on human relation not skill levels" are considered. The teacher views a list of the students of each group and re-organizes or modifies the group organization based on the above viewpoints. Thus, the kinds of groups are finally determined. A basic group of a little number of students (2 to 5 in the embodiment) is organized, and then the class is organized by gathers some basic groups. The education is carried out in units of basic groups.

Next, a course design is carried out based on the kinds of the groups and the students of each group, while referring to the teaching material management file of the teaching materials database 202 (Step S13). Thus, the education course is determined. Next, whether or not the designed course is optimal is checked (Step S14). When it is determined that the course is not optimal, correction is carried out (Step S15).

With the above, the group organization completes. An example of the group organization is shown in FIG. 5. In FIG. 5, in the first group, the student C is low in the test result, high in , erroneous answer rate, and cannot keep the concentration. For this reason, the first group is organized such that the student A teaches the learning contents to the student C and the student B teaches a way of keeping concentration to the student C.

Next, the education carried out to the above-mentioned organized groups using the education modules will be described with reference to the flow chart of FIG. 6.

The education is mainly divided into the acquisition of knowledge and practical exercise. The education to learn points before the practical exercise is contained in the acquisition of the knowledge. Also, learning of the items such as a resolution service, measurement, and the comprehension of structure are contained in the practical exercise.

For example, each student is allocated with the learning terminal 30 such as a personal computer, and learns using it. A set of education modules is prepared based on the kind of organized group in consideration of the test result of the admission test. Therefore, the learning is carried forward in accordance with the education modules which are determined based on the education course. It should be noted that when the group organization is changed to be described later, the education modules are changed to meet the new group organization.

It is determined which of individual leaning and group learning is first carried out (Step S20). It should be noted that the above-mentioned group learning does not mean that the whole of education is carried out in units of groups, and contains both of individual education and group education. The learning such as the outline and the basis is mainly carried out individually, and the learning such as application and the actual technique to be mentioned later is carried out in the group. Basically, the individual learning is carried out using the learning content and an education program determined to meet each individual. The items to learn in the group are carried out in the group, e.g., the practical exercise. As for the general education items, the group learning is carried out at any time.

When the group learning is determined at the above step S20, learning in the lecture form is first carried out (Step S21). That is, the student starts up the learning terminal 30. Then, the student logs into the learning program using the ID and the password of the student. The ID and the password are used to supervise the student. Also, because the student logs in individually, his history data at the present time can be seen. With this, the whole history and the learning history of the education modules in each course can be seen.

Below, a case to learn an engine structure will be described as an example. When logging into the learning terminal 30, the course map to learn the engine structure is displayed based on the education module management file, as shown in FIG. 7. This course map shows that after learning completion of C1001 "summary of engine", the student can select one of C1021 "cylinder head", C1031 "cylinder block", C1121 "exhaust unit" and C1211 "lubricating unit". In this case, the education module not yet learned by the student and the education modules already learned by the student are displayed with different colors. Therefore, there is an advantage that it is easy to understand the education module visually. When the education module is erroneously selected, an error message is returned. Also, an education module that the student should learn is recommended, even if the student selects an education module which the student cannot learn.

It should be noted that the course map shown in FIG. 7 is an example when a plurality of courses exist for one elementary item. However, one or more courses may exist for each of a plurality of elementary items. Also, the course map is previously set as mentioned above basically. However, the course map may be automatically changed optionally by the teacher or a system in accordance with the character of the student and the group.

Also, the learning contents of "summary of engine" can be selected based on not the learning level but the kind of the teaching materials. For example, video teaching material is selected to a student who is adaptive for teaching material in which picture, audio and characters are combined. Teaching material of still images and sentences is selected to a student who is adaptive for teaching material in which still images such as photograph and animation and sentences are combined. Teaching materials of only sentences is selected to a student who is adaptive for the teaching materials of only the sentences. Teaching materials of only audio is selected to a student who is adaptive for the audio teaching materials. Teaching material of an actual article is selected to a student who is adaptive for the teaching material of the actual article. In this way, the teaching materials easy for each student to accept can be selected even when one item is learned.

In this way, by providing the teaching materials suitable for each student, the efficient education with variety can be carried out which is not a conventionally standardized education.

When all or some of the students of a group carry out a group learning, it is possible to provide the teaching materials for the group learning, and the teaching materials for the group learning is different from those of the individual learning. Also, the education module as the teaching materials may be changed from "video image" to "still image" as the learning progresses.

Moreover, the learning time (lecture time and the practical exercise time) is determined in the education course for the automobile service, in addition to the learning items. Therefore, unlike usual individual learning, it is not permitted to skip the items even if the student already understands the item, and to complete all the items in a short time. Of course, the individual learning may be carried out like usual schooling using this education system. In this case, there is a skip function and a student who understood the items can skip the items.

Because the learning using the education modules is carried out using the computer, the learning time is automatically measured. The measured time is stored in the student database 200 for the student. Therefore, it provides a learning time limit to one education module so that the learning is ended in the time. Also, it is possible to manage the student in the total learning time even when the learning of an item cannot be ended within the learning time limit. Thus, a necessary learning time can be ensured. That is, unlike the conventional learning, it is not necessary to set a temporal regulation that one item should be ended in a time. However, because it is possible to manage the learning time correctly as a whole or for every education module, it takes an enough time to learn items weak to the student and important items.

The confirmation of the learning result is carried out through a test every education module when each student determines to have understood the education module. Because the test result can be determined at once, the test is repeated until right answers are given to all questions. Then, the student is permitted to advance to the following education module when the student right answered to all the questions. In the test, all the questions may be always same, and all the questions or only erroneously answered questions may be presented again. Otherwise, another form of questions relating to erroneously answered questions may be presented even if the range of questions is same.

The student who has leeway temporally may advance towards the following education module, or may carry out further learning using an option module like a revision module. The student may help another student of the group who is late in comprehension. With this, it is linked with the improvement of the human relations in which the student who is good at the subject helps the student who is not good at the subject. As a result, the teamwork of the group is improved and the learning can be promoted through the teamwork.

Next, a practical exercise is carried out after the lecture or individual learning is ended as mentioned above (Step S22). The practical exercise is carried out in accordance with the education module shown by the exercise terminal 40. For example, the practical exercise of an engine is carried out in the group in combination of real teaching materials and virtual teaching materials, using a large screen image. Especially, because there is a case that a student is strong or weak in mechanics, the group learning is more effective, compared with a case where the individual learning is carried out. Also, in order to reduce the number of teaching materials necessary for the practical exercise, the group learning is carried out. Therefore, the time zones while the teaching materials are used can be distributed easily, compared with the case that the learning is carried out in units of classes. Thus, a quantity of the teaching materials can be reduced.

When it is determined at the above step S20 that the individual learning is carried out, the lecture learning (step S23) and the practical exercise (step S24) are carried out. The way of the lecture learning and the practical exercise are the same as those of the above mentioned lecture learning (step S21) and the practical exercise (step S22), excluding that the used education modules are different.

Next, evaluation is carried out (Step S25). That is, progress situations of the learning are stored in the student database 200 of the database apparatus 22 as the personal data. When the education management server 20 determines that the individual or group learning of a set of education modules is ended, the education management server 20 accesses the evaluation database 203 to retrieve an achievement test relating to the education course and carries out the achievement test with questions. The education management server 20 stores answers to the questions in the evaluation database 203 and stores test result in the student database 200. The test is carried out at every predetermined period such as period or year based on the contents of the student database 200 and the evaluation is carried out. The evaluation may be carried out in some methods.

In the first method, academic ability of each of the students or groups is evaluated, and the evaluation is carried out based on the test result. In the first method, for example, points acquired in the final test are converted from data of 100 steps into data of 5 steps in accordance with the above-mentioned rule. In the second method, the character of each of the students or the groups is determined. In the second method, for example, the teacher classifies the character of the individual or group into 5 steps for the above-mentioned items shown as (2-1) to (2-14) through the observation of the student or group every day. It should be noted that the points of the character classification carried out in entrance based on the ego gram theory might be adjusted. In the third method, the first and second methods are combined. For example, the points acquired in the second method are added to the point acquired in the first method and the addition result is divided into a half, and then the divided result is classified into 5 steps. FIG. 8 is a diagram showing an example of the evaluation result. In FIG. 8, the first group shows the test result, erroneous answer rate and concentration of C are improved.

When the above-mentioned evaluation completes, whether or not the education is ended is checked (Step S26). That is, whether or not the learning is ended about all the education modules of the education course is checked. When the learning is determined to be ended, the education about the course is ended. On the other hand, when not the learning is determined to be not ended at the above step S26, whether or not the present group should be continued (Step S27). This is carried out by examining whether or not the purpose of the configuration of the group is achieved. When it is determined that the purpose of the configuration of the group is achieved, it is recognized that the group should be continued. Then, the sequence returns to the step S20 and the learning of the following step is started.

On the other hand, when it is determined that the purpose of the configuration of the group is not achieved, the reorganization of the group is carried out (Step S28). The reorganization of the group is similar to the steps S10 to S13 in FIG. 4. It should be noted that there is a case that the group is reorganized based on the relation to the other group even when the purpose of the configuration of group is achieved.

When the purpose of the configuration of the group is not achieved, the following two causes are thought of. The first cause is that the basis data when the group is organized is not proper (the configuration ratio data of the academic ability data and the character data which is used to organize the group). The second cause is concerned with the personal data. It could be considered that few errors occur for academic ability data of the personal data because it is determined from the test result. On the other hand, it could be considered that the character data of the personal data contains an error because a diagnosis test itself is statistical data. Therefore, it could be considered that an error is contained in the diagnosis result in the initial stage. In this case, the teacher in charge corrects character data. In this embodiment, the values of CP, NP and so on of the character classification are corrected.

Because the reorganization of the group is determined based on the personal data of the students who belong to the group, there is a case that reorganization of a part of groups is carried out, even if the reorganization of the whole groups is not carried out. When the above reorganization of the groups is carried out, the sequence returns to the step S20, the learning of the following education module is started using a new group as a fundamental unit.

By repeating the above-mentioned sequence until graduation, the skill level of each student can be improved to a desired skill level. By improving the skill level of the whole group to the desired skill level, the learning purpose of the whole students is achieved. Also, it is possible to improve an average skill level.

As described above, according to the education system in accordance with the present invention, it is possible to improve the skill level of the whole group, and it is possible to improve the skill level of the student through education determined in accordance with the ability and personality of the student.

Also, according to the education system of the present invention, because it is possible to organize a group to fit with a predetermined purpose, it is possible to improve the autonomy of the student by arranging the students based on human relation not considering the skill level too much.

What is claimed is:

1. An education system comprising:
a network;
individual learning terminals connected with said network and provided for individual learning of students;
a group learning terminal connected with said network and provided for group learning of a group of the students; and a learning management server connected with said network to provide first education modules for the individual learning to said individual learning terminals and second education modules for the group learning to said group learning terminal; and
(i) a student database which has personal data of the students; and
(ii) a group database which has a group organization list including education items corresponding to education purposes,
wherein said learning management server automatically organizes the group based on said personal data of the students and a selected one of said education items; and
wherein said personal data includes ability data and character data derived from personality tests of each of the students.

2. The education system according to claim 1, wherein said learning management server represents the education items of the group organization list to allow a teacher to select one of the education items based on education policies.

3. The education system according to claim 1, wherein said database apparatus further stores a teaching materials database which has education modules including said first and second education modules, and said learning management server supplies said first and second education modules to said individual and group learning terminals, respectively.

4. The education system according to claim 3, wherein said teaching materials database further has an education module management file which indicates link relations of said education modules, and each of the link relations is determined based on a kind of the group, and said learning management server refers to said education module management file based on the kind of the group to supply said first and second education modules to said individual and group learning terminals, respectively.

5. The education system according to claim 3, wherein each of said education modules has sub-modules in a hierarchy, and the individual learning and the group learning are carried out based on the sub-modules in the hierarchy.

6. The education system according to claim 1, wherein said database apparatus further stores an evaluation database which has evaluation materials, each of said first and second education modules has a learning time limit, and said learning management server refers to said evaluation database to retrieve one of said evaluation materials corresponding to the group when said individual learning or group learning is ended within the learning time limit, and supplies a test to said individual learning terminal for each of the students or said group of students learning terminal for the group based on the retrieved evaluation material.

7. The education system according to claim 6, wherein said learning management server evaluates the students of the group or the group based on a result of the test, and stores the test result in said student database.

8. The education system according to claim 7, wherein said learning management server determines whether the group of students should be reorganized, based on the test result when the individual learning of a set of said first education modules is ended or the group learning of a set of said second education modules is ended.

9. An education method comprising the steps of:

(a) automatically organizing a group of students for a selected education course on the basis of personal data which includes ability data and character data derived from personality test of each of the students;

(b) supplying first education modules to an individual learning terminal via a network for individual learning of each student of the group;

(c) supplying second education modules to a group learning terminal via the network for group learning of the group;

(d) carrying out a test to evaluate the students and the group; and (e) selectively reorganizing the group based on the evaluation result.

10. The education method according to claim 9, wherein said (a) automatically organizing step comprises the steps of:

(f) retrieving said personal data of the students from a student database;

(g) retrieving a group organization list from a group database, said group organization list including education items, one of which corresponds to the selected education course; and (h) automatically organizing the group based on said personal data and one of said education items corresponding to the selected education course.

11. The education method according to claim 10, wherein said (g) retrieving step comprises the step of:

representing the education items of the group organization list to allow a teacher to select one of the education items based on education policies.

12. The education method according to claim 10, wherein each of said first and second education modules has a learning time limit, said (d) carrying out step comprises the steps of:

referring to an evaluation database to retrieve one of evaluation materials corresponding to said education course when said individual learning or group learning is ended within the learning time limit; and carrying the test which is produced from the retrieved evaluation material.

13. The education method according to claim 12, wherein said (d) carrying out step comprises the step of:

storing the test result in a student database.

14. The education method according to claim 9, wherein said (b) supplying step comprises the step of:

retrieving said first education modules from a teaching materials database based on said education course to supply said first education modules, and said (c) supplying step comprises the step of:

retrieving said second education modules from said teaching materials database based on said education course to supply said education modules.

15. The education method according to claim 14, wherein each of said (b) and (c) supplying steps comprises the step of:

referring to an education module management file of said teaching materials database based on said education course to determines said first or second education modules, wherein said education module management file indicates link relations of education modules, and each of the link relations is determined based on said education course.

16. The education method according to claim 14, wherein each of said education modules has sub-modules in a hierarchy, and the individual learning and the group learning are carried out based on the sub-modules in the hierarchy.

* * * * *